United States Patent [19]

Flory

[11] 4,165,513

[45] Aug. 21, 1979

[54] SIGNAL-OPERATED MARKING DEVICE

[76] Inventor: Harold E. Flory, Seasharp Limited, Richborough Hall, Ramsgate Rd., Kent Ct. 9 NP, England

[21] Appl. No.: 816,272

[22] Filed: Jul. 15, 1977

[30] Foreign Application Priority Data

Oct. 7, 1976 [GB] United Kingdom ............... 41730/76

[51] Int. Cl.² .............................................. G01D 15/16
[52] U.S. Cl. ..................................... 346/141; 178/96; 346/143; 401/88
[58] Field of Search ........... 346/141, 143, 140, 139 C, 346/139 R; 178/96, 89; 400/88, 29; 401/48

[56] References Cited

U.S. PATENT DOCUMENTS

| | | | |
|---|---|---|---|
| 1,399,429 | 12/1921 | Hulit | 178/96 |
| 1,550,048 | 8/1925 | Ruben | 346/143 X |
| 1,656,338 | 1/1928 | Ranger | 346/140 X |
| 2,891,107 | 6/1959 | Weingart | 346/140 X |
| 3,707,002 | 12/1972 | Howell | 346/141 X |
| 4,015,269 | 3/1977 | Edo | 346/139 C |
| 4,095,906 | 6/1978 | Sackett | 401/48 |

Primary Examiner—Joseph W. Hartary

[57] ABSTRACT

A marking device includes a case which may be held by a user in the fashion of conventional writing and marking instruments. A ball point pen, felt tip pen, pencil or crayon is positioned within the case. In the instances of the pens, a soft iron collar is fixed or adjustably connected to the pen. In the instances of the pencil or crayon, a movable, hollow, soft iron collar is positioned about the pencil or crayon, a plurality of balls of non-magnetic, non-magnetizable material are provided within the collar to hold the pencil or crayon in fixed, preferably adjustable, position when the collar is moved downwardly. An electro-magnet or solenoid responsive to electrical signals or pulses is placed in the vicinity of the fixed or movable soft iron collar.

1 Claim, 2 Drawing Figures

FROM AMPLIFIER, INPUT TO HEADPHONES, AMPLIFIER FED BY LIGHT DETECTOR OR AMPLIFIER FED BY MICROPHONE.

SIGNAL-OPERATED MARKING DEVICE

BACKGROUND AND SUMMARY OF THE INVENTION

This invention relates to a signal-operated marking device and, more particularly, by such a device which responds to electrical signals.

The purpose of this invention, in a preferred aspect, is to adapt a ball pen tube assembly, consisting of the ball, ball housing, tube, tube assembly and ink, such assemblies being readily available and known as ball pen refills, to mark upon any type of writing paper in response to an electrical pulse or signal, as the ball pen assembly is drawn or moved across any type of writing paper.

The principle aim of the invention is to provide a means of identifying International Morse-Code characters into their respective letters or numbers by a person not trained or skilled in the arts. The characters of the International Morse-Code of dots and dashes are arranged in various combinations to indicate letters or numbers. An example is the International distress call S.O.S., which in International Morse-Code characters is three dots for S, three dashes for O and repeat three dots for S. These signals are often transmitted by radio or light, and this invention is suitable for both types of signals thus transmitted, as well as signals transmitted via telegraph lines. Another function of the invention is to enable the Consol position finding system to be more readily identified. The Consol beacon transmits a radiation pattern of alternate dot and dash sectors separated by an equi-signal (continuous note) formed by merging of the dots and dashes. Any person on a vehicle hearing the signal can, by merely counting the number of dots and dashes, translate the count into a great circle bearing. A total of 60 dot dash characters are transmitted in each operating cycle. It is difficult to get the exact number of dots and dashes, as the equi-signal fades between the dots and dashes or dashes and dots. With this invention, the dots and dashes that are missing to make the count of 60 are more readily identified.

Another purpose of the invention is that it enables the null signal that has to be found from a radio transmitting station to be more readily identified, particularly if radio interference or background noise is being received when a null signal is being sought. The pen is drawn across the paper at the time that the null is being sought; the pen will stop marking at the lowest signal noise level, thus indicating pictorially when the null signal is being received.

Accordingly, the invention is one illustrative embodiment consists of a ball pen assembly consisting of the ball, ball housing, tube, cap and ink, such an assembly being generally described as a ball pen refill. The ball pen assembly is mounted into a suitably constructed case or frame, so that when the case or frame is positioned vertically, the ball pen assembly is arranged downwards, or at the lower end of the case or frame. This suitably constructed case or frame is wide and flat at the lower end, in order to stand vertically upon an approximately horizontal surface, such as a table or writing pad held upon the knee or in the hand.

The ball pen assembly as described is arranged to move quite freely lengthwise in the case or frame with a minimum of sideways movement, thus if the case or frame is held approximately vertical with the wide and flat end downwards against the sheet of paper, the ball pen assembly will be at rest with the ball upon the paper. There are two types of ball pen assemblies readily available. These use respectively wet or dry ink. If a dry ink type of ball pen assembly is fitted in the manner described, when the flat end of the case or frame is held against the writing paper and drawn across the writing paper, the ball will not mark upon the paper. To make the ball mark the paper, the ball has to revolve by exerting pressure or weight upon the ball pen assembly, which has been arranged to move quite freely in the case or frame. The most convenient manner in which to do this is by means of an electro-magnet or an electrical solenoid device. The wet ink type of ball pen assembly requires less pressure or weight to revolve the ball, and provision must be made to accomplish this by means of a counter-balance or spring to support and neutralize the weight of the wet ink type ball pen assembly.

The invention is not limited in its function to the two types of ball pen assemblies described, although experiments have shown them to be the most convenient. A felt tip pen is equally satisfactory and is arranged by means of a counter-weight or spring not to rest upon the paper, but have a small clearance or gap between the actual felt tip and the writing paper. A lead pencil refill or crayon may be used, providing a suitable arrangement is provided to adjust for wear that will take place as the lead pencil refill or crayon marks the paper.

DETAILED DESCRIPTION OF THE PREFERRED EMBODIMENTS

Figure 1:
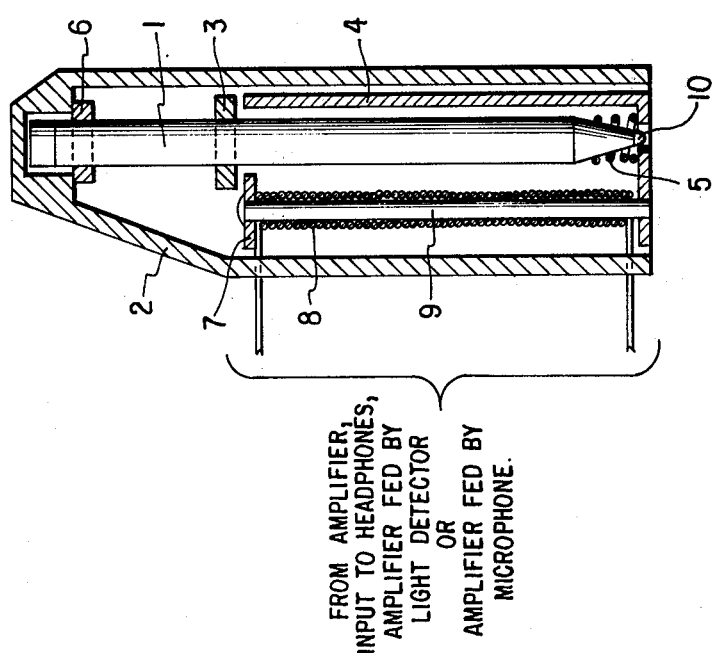
FIG. 1 is a side, partially sectional view of an exemplary embodiment of a signal-operated device according to the present invention.

The illustrated embodiments and a number of variants of the invention will now be described with reference to the accompanying figures of drawing. The drawing FIG. 1 shows a ball pen assembly 1 fitted with a soft iron collar 3 mounted into a frame 4. The frame 4 is provided with a soft iron core 9, a coil 8, and a soft iron pole piece 7. A case 2 is arranged to fit over the frame 4 and allow the ball pen assembly 1 to move quite freely vertically within it. The base of the frame 4 or the case 2 is arranged with a suitable hole to allow a ball 10 of the ball pen assembly, a pencil end, a felt tip or a crayon, to locate and protrude through beneath. When an electric current is passed through a coil 8, which is wound around the soft iron core 9, the open end of the frame 4 and the soft iron pole piece 7 becomes magnetized and will pull the soft iron collar 3 towards them in order to close the electro-magnetic circuit. It is to be appreciated that the soft iron collar 3 may be either fixedly connected to the pen assembly 1 or be axially adjustably connected thereto, the latter being preferred.

FIG. 1 shows an embodiment of the invention when used with either a wet ink ball pen assembly or a felt tip pen. A spring 5 is arranged to hold the wet ink ball pen assembly or a felt tip pen above the bottom of a hole in the frame 4 by a fixed or adjustable amount by a collar 6 and thus prevents the wet ink ball pen assembly or felt tip pen touching with the minimum of clearance and therefore marking the writing paper. When the coil 8 is energized, the electro-magnetic circuit will pull the soft iron collar 3 to the frame 4 and the soft iron pole piece 7, causing the wet ink ball pen assembly or felt tip pen to protrude through the bottom of the hole in the frame 4 and touch or press against the writing paper.

Figure 2:
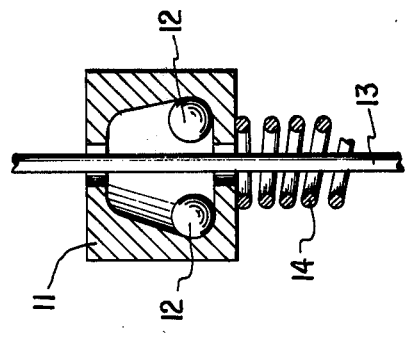
FIG. 2 is a side, partially sectional view of a portion of a second exemplary embodiment of the present invention.

In order to use a lead pencil refill or crayon in place of the pens, a second embodiment illustrated in FIG. 2 is provided. A lead pencil refill or crayon 13, when held upright or vertically in a free manner, has insufficient weight to legibly mark writing paper. In order for the second embodiment of the invention to function correctly, a means must be provided to exert pressure upon the lead pencil refill or crayon 13 and automatically replace the wear that must take place upon the lead pencil refill or crayon as the writing paper is marked. The soft iron collar 3 in FIG. 1 is replaced with soft iron collar 11 (FIG. 2), which is arranged to have a tapered internal annulus of such dimensions as to accommodate at the larger diameter a plurality of balls 12 of a diameter that allows the lead pencil refill or crayon 13 to pass freely between the space in the center of the plurality of balls 12. The balls 12 are made of non-magnetic, non-magnetizable material, preferably a hard, light material such as nylon. At least three balls are required to constitute the plurality. The most convient number is five. If three balls are used, they desirably have a diameter four times the diameter of the pencil or crayon. If the diameter of the balls correspond to the diameter of the pencil or crayon, it is to be appreciated that the number of balls should be five. In each case, the balls are desirably of equal diameter. The smaller diameter of the tapered internal annulus is arranged not to allow the lead pencil refill or crayon 13 to pass freely through the space in the center of the plurality of balls 12. A suitable spring 14 is arranged to hold the soft iron collar 11 above the soft iron pole piece 7 and the frame 4. When the electromagnetic circuit is made, the soft iron collar 11 moves down rapidly to close the electro-magnetic circuit, compressing the spring 14 (FIG. 2), and causing the plurality of balls 12 to wedge the lead pencil refill or crayon 13 between them and the smaller diameter of the tapered internal annulus, exerting pressure upon the lead pencil refill or crayon 13, thus making a mark upon the writing paper. As the function of the invention is to make an interrupted line or mark, the wear upon the lead pencil refill or crayon 13 is automatically adjusted at each interruption, because the plurality of balls 12 return to the larger diameter, thus allowing the lead pencil refill or crayon 13 to fall and rest upon the writing paper, ready to mark when the next signal or pulse is received. The soft iron collar 11 may be replaced by a ball rolling wedge device, flexible concaved diaphragm with a centre hole, tapered central collet and the like.

In order to use the invention to identify the signals transmitted by radio or wireless—such signals being normally received and heard from a radio or wireless receiver loudspeaker—in this application of the invention, the coil 8 would be energized by a microphone and suitable amplifying circuit, placed near the radio or wireless receiver loudspeaker. Should the signal be received and heard by headphones, the microphone can be dispensed with and the amplifier connected directly to the headphones input supply, such devices being well known and available.

To use the invention to identify International Morse-Code signals transmitted from a light source, a suitable light detecting or sensing device is arranged to receive the light and, by means of a convenient amplifier, energize the coil 8.

It is to be understood that the foregoing description and accompanying figures of drawing relate to exemplary embodiments set out by way of example. It is to be appreciated that numerous other embodiments and variants are possible without departing from the spirit and scope of the invention, its scope being defined by the appended claims.

What is claimed is:

1. An electrically actuated, hand-holdable marking apparatus comprising a marker member, an electromagnetic device which when energized by electrical pulses causes the marker member to bear on a surface to be marked with sufficient pressure that said marker member marks the surface, a casing which can be held in a user's hand and encloses said marker member and said electromagnetic device, said casing having a slider portion for sliding across the surface to be marked and an aperture in said slider portion through which an end of said marker member can pass, a cage containing a plurality of balls and having a conical inner surface which slopes away from the marking end of said marker member, said cage being of magnetizable material and being positioned about said marker member, said balls and said conical surface co-operating when said cage moves towards said electromagnetic device when it is energized to cause said balls to move inwardly and grip said marker member, and spring means in said casing adjacent to said cage, said cage being urged by said spring means in a direction opposite to the direction of movement of said cage toward said electromagnetic device, said casing of the apparatus being such that in use it is held in the user's hand and is moved across the surface to be marked with said slider portion of said casing in contact with the surface to be marked, and said slider portion comprising a flat surface portion of said casing which is of a sufficient area that it will support the apparatus in an upright position on a substantially horizontal surface to be marked, whereby when the electromagnetic device is energized it causes said marker member to move with respect to the surface to be marked and mark the surface with marks that are of a length dependent upon the duration of the electrical pulses and velocity at which the user moves the apparatus across the surface to be marked.

* * * * *